US012662107B2

(12) United States Patent
Park et al.

(10) Patent No.: US 12,662,107 B2
(45) Date of Patent: Jun. 23, 2026

(54) STEERING APPARATUS FOR VEHICLE AND CONTROL METHOD THEREFOR

(71) Applicant: HYUNDAI MOBIS CO., LTD., Seoul (KR)

(72) Inventors: Hae Kwon Park, Yongin-si (KR); Byeung Su Kim, Yongin-si (KR); Jae Hong Jeon, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 17 days.

(21) Appl. No.: 18/789,962

(22) Filed: Jul. 31, 2024

(65) Prior Publication Data

US 2025/0065861 A1 Feb. 27, 2025

(30) Foreign Application Priority Data

Aug. 21, 2023 (KR) ........................ 10-2023-0109169

(51) Int. Cl.
*B60W 10/20* (2006.01)

(52) U.S. Cl.
CPC ......... *B60W 10/20* (2013.01); *B60W 2520/10* (2013.01); *B60W 2520/125* (2013.01); *B60W 2540/18* (2013.01)

(58) Field of Classification Search
CPC ............. B60W 10/20; B60W 2520/10; B60W 2520/125; B62D 5/001; B62D 5/0469; B62D 5/0481; B62D 5/003; B62D 6/008
See application file for complete search history.

(56) References Cited

U.S. PATENT DOCUMENTS

| | | | |
|---|---|---|---|
| 2005/0178606 A1* | 8/2005 | Husain | B62D 5/003 |
| | | | 180/408 |
| 2005/0279562 A1* | 12/2005 | Hara | B62D 5/003 |
| | | | 180/443 |
| 2018/0244304 A1* | 8/2018 | Sakamaki | B62D 5/0433 |
| 2019/0202492 A1* | 7/2019 | Niwa | B62D 5/0421 |
| 2019/0367084 A1* | 12/2019 | Hong | B62D 6/008 |
| 2022/0315100 A1* | 10/2022 | Shimizu | B60W 50/029 |
| 2023/0058353 A1* | 2/2023 | LaBarbera | B62D 15/029 |
| 2025/0100614 A1* | 3/2025 | Kim | G06N 20/10 |

* cited by examiner

*Primary Examiner* — George C Jin
(74) *Attorney, Agent, or Firm* — Novo TechIP International PLLC

(57) ABSTRACT

A control method for a vehicle for steering based on a steering-by-wire (SBW) system, the control method for a vehicle comprising: calculating a maximum limit steering value of a steering wheel when an abnormality occurs in the SBW system; calculating a correction coefficient for the maximum limit steering value on the basis of a speed of the vehicle and a road surface condition; generating endpoint reaction force feeling for the steering wheel; determining whether a required steering value input to the steering wheel exceeds the maximum limit steering value; and transmitting a warning sound and applying a reaction force to the steering wheel when a determination is made that the required steering value exceeds the maximum limit steering value.

10 Claims, 6 Drawing Sheets

<u>200</u>

STEERING APPARATUS FOR VEHICLE AND CONTROL METHOD THEREFOR

CROSS-REFERENCE TO RELATED APPLICATIONS

This application claims the benefit of priority to Korean Patent Application No. 10-2023-0109169, filed in the Korean Intellectual Property Office on Aug. 21, 2023, the entire contents of which are incorporated herein by reference.

TECHNICAL FIELD

The present disclosure relates to a steering apparatus for a vehicle and a control method therefor.

BACKGROUND

The content described in this section simply provides background information for the present disclosure and does not constitute related art.

A steering-by-wire (SBW) system transfers driver's steering intention using an electrical signal without a mechanical connection between a steering wheel and wheels of a vehicle. The SBW system includes a road wheel actuator (RWA) which transfers the driver's steering intention to the wheels of the vehicle to drive the wheels, and a steering feedback actuator (SFA) which provides a reaction force of the steering wheel to the driver.

The SBW system has a problem that a steering function of the vehicle is lost when an abnormality such as a wire defect occurs. When the steering function of the vehicle is lost, there is a problem that a difference between a required steering value input to the steering wheel by the driver and an actual steering value of the vehicle is generated. Here, there is a problem that the required steering value required by the driver is not satisfied even when the vehicle performs backup steering, and steering stability of the vehicle is degraded.

SUMMARY

A steering apparatus for a vehicle according to an embodiment can generate a steering angle corresponding to an actual steering value of the vehicle and estimate a steering endpoint of a steering wheel to assist in steering of the vehicle.

The steering apparatus for a vehicle according to an embodiment can determine a maximum limit steering value based on a speed of the vehicle and a road surface condition, notify a driver of a warning when a required steering value exceeding the maximum limit steering value is input, and provide a reaction force impression, feedback or feeling for the steering wheel.

The problems to be solved by the present disclosure are not limited to the problems mentioned above, and other problems not mentioned can be clearly understood by those skilled in the art from the description below.

A control method for a vehicle for steering based on a steering-by-wire (SBW) system, the control method for a vehicle comprising: calculating a maximum limit steering value of a steering wheel when an abnormality occurs in the SBW system; calculating a correction coefficient for the maximum limit steering value based on (or on the basis of) a speed of the vehicle and a road surface condition; generating an endpoint reaction force impression, feedback or feeling for the steering wheel; determining whether a required steering value input to the steering wheel exceeds the maximum limit steering value; and transmitting a warning sound and applying a reaction force to the steering wheel when a determination is made that the required steering value exceeds the maximum limit steering value.

The calculating of the maximum limit steering value of the steering wheel includes calculating a lateral acceleration of the vehicle on the basis of a rotation compensation value due to one-way braking of the vehicle, a rotation compensation value due to a driving force of the vehicle, and a steering angle by a rear wheel steering system of the vehicle.

The calculating of the maximum limit steering value of the steering wheel includes estimating a rotation radius of the vehicle by calculating the speed of the vehicle and the lateral acceleration of the vehicle; and determining a maximum limit steering value using the estimated rotation radius and a wheelbase value of the vehicle.

The correction coefficient corrects the maximum limit steering value on the basis of a road surface friction coefficient.

The transmitting of the warning sound and the applying of the reaction force to the steering wheel include applying an endpoint steering impression, feedback or feeling to the steering wheel by setting a resistance value based on a steering angle of the steering wheel.

A steering apparatus for a vehicle for steering based on an SBW system, the steering apparatus for a vehicle comprising: a sensor unit configured to detect driving traveling information of the vehicle; a main controller configured to generate a backup steering reaction force impression, feedback or feeling for the SBW (Steering-By-Wire) system and determine a maximum limit steering value of the vehicle; a steering wheel configured to receive a required steering value based on driver's steering intention; and a reaction force generation actuator configured to generate a reaction force impression, feedback or feeling for the steering wheel on the basis of the maximum limit steering value.

The sensor unit detects at least one of a speed of the vehicle, a driving direction traveling angle of the vehicle, an angular velocity of the vehicle, and a road surface condition.

The main controller calculates a lateral acceleration of the vehicle on the basis of a rotation compensation value due to one-way braking of the vehicle, a rotation compensation value due to a driving force of the vehicle, and a steering angle by a rear wheel steering system of the vehicle.

The main controller estimates a rotation radius of the vehicle by calculating a speed of the vehicle and the lateral acceleration of the vehicle, determines a maximum limit steering value using the estimated rotation radius and a wheelbase value of the vehicle, and calculates a correction coefficient based on a road surface condition, for the maximum limit steering value.

The main controller determines whether the required steering value input to the steering wheel exceeds the maximum limit steering value, and transmits a warning sound and applies a vibration to the steering wheel when a determination is made that the required steering value exceeds the maximum limit steering value. According to an embodiment, there is an effect that the steering apparatus for a vehicle can generate the steering angle corresponding to the actual steering value of the vehicle and estimate the steering endpoint of the steering wheel to assist in steering of the vehicle.

According to an embodiment, there is an effect that the steering apparatus for a vehicle can determine the maximum limit steering value based on the speed of the vehicle and the road surface condition, notify the driver of the warning when the required steering value exceeding the maximum limit steering value is input, and provide the reaction force impression, feedback or feeling for the steering wheel.

DETAILED DESCRIPTION

Figure 1:
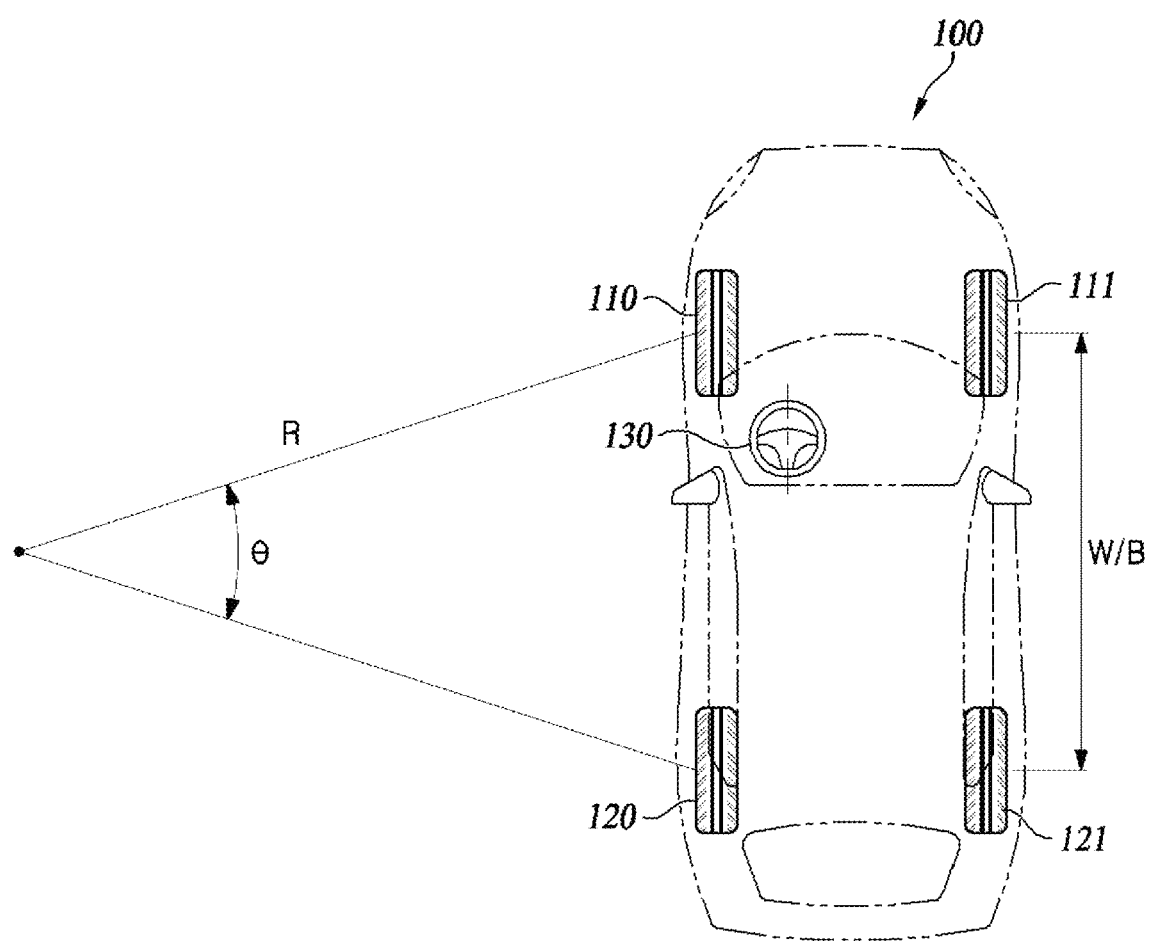
FIG. 1 is a diagram illustrating a rotation radius of a vehicle and a maximum limit steering value of the vehicle.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is a diagram illustrating a rotation radius of a vehicle and a maximum limit steering value of the vehicle.

Figure 2:
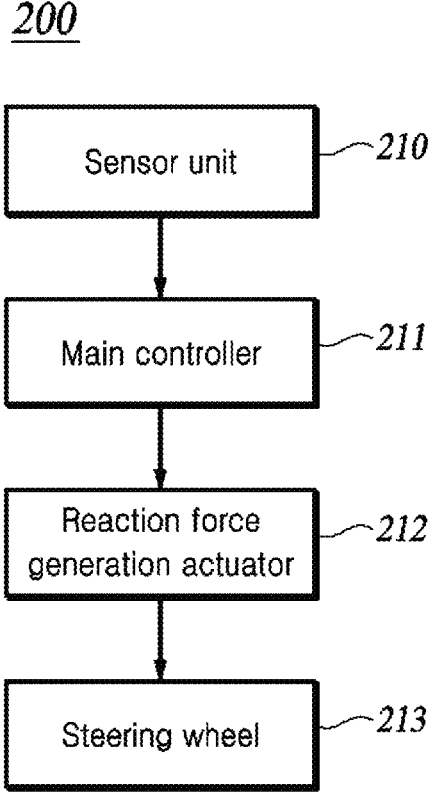
FIG. 2 is a block diagram schematically illustrating a steering apparatus for a vehicle according to an embodiment of the present disclosure.

FIG. 2 is a block diagram schematically illustrating a steering apparatus for a vehicle according to an embodiment of the present disclosure.

A steering apparatus 200 for a vehicle according to an embodiment of the present disclosure includes at least one of a sensor unit 210, a main controller 211, a reaction force generation actuator 212, and a steering wheel 130.

The sensor unit 210 includes some or all of an accelerator pedal position sensor, a brake pedal position sensor, a steering angle sensor, a steering torque sensor, and an engine torque sensor.

The sensor unit 210 generates an output signal based on or on the basis of travelling information of the vehicle. The sensor unit 210 transmits the generated output signal to the main controller 211. Here, the output signal generated by the sensor unit 210 may be transmitted to the main controller 211 via an in-vehicle network (IVN).

An accelerator pedal sensor detects a position of an accelerator pedal when the driver steps on the accelerator pedal. The position of the pedal is converted into an electrical signal on the basis of a degree of stepping on the pedal. Here, the converted electrical signal may be an analog voltage or a digital signal.

The brake pedal sensor detects a stroke applied to the brake pedal by the driver.

The steering angle sensor and steering torque sensor detect a steering angle and a steering torque input to the steering wheel 130. That is, the steering angle sensor and the steering torque sensor detect driver's steering intention.

The engine torque sensor detects a torque generated from an engine of the vehicle 100. The engine torque sensor may be disposed on an output axis of the engine or a transmission. When the engine operates and the torque is generated, the engine torque sensor may detect the torque.

The main controller 211 includes a rear wheel steering system. However, the present disclosure is not limited thereto. The rear wheel steering system may be operated using a controller formed separately from the main controller 211. When an abnormality occurs in the SBW system, a left front wheel (FL) 110 and a right front wheel (FR) 111 lose a steering function. Accordingly, the rear wheel steering system may assist in steering the vehicle 100 by steering a left rear wheel (RL) 120 and a right rear wheel (RR) 121.

The main controller 211 may be an electronic control unit. The main controller 211 may receive the driving information of the vehicle 100 detected by the sensor unit 210.

The steering apparatus 200 for a vehicle according to an embodiment of the present disclosure may perform backup steering using a torque vectoring factor. Here, the torque vectoring factor includes some or all of an accelerator pedal position, a brake position, a steering angle, a steering torque, an engine torque, a braking torque of each wheel, and a steering angle of a rear wheels.

In explaining the present disclosure, a steering-by-wire (SBW) system uses electrical signals without a mechanical connection between the steering wheel 130 and the wheel of the vehicle 100. The SBW system refers to a steering system that transfers driver's steering intention to the vehicle 100 using electrical signals. According to an embodiment, the SBW system may include a Steering Feedback Actuator (SFA) system and a Road Wheel Actuator (RWA) system. The SFA system and the RWA system may be connected using a wire that transfers electrical signals. The SFA system is a system that generates steering control information of the vehicle 100 on the basis of a degree to which the steering wheel 130 of the vehicle 100 rotates, a user input, and the like, and provides a reaction force of the steering wheel to a user. The RWA system may be a system that operates the wheels of the vehicle 100 on the basis of the steering control information. Here, the steering control information refers to information for determining and controlling a degree of rotation of the wheel of the vehicle 100 on the basis of the degree to which the steering wheel 130 of the vehicle 100 rotates, the user input, and the like. The steering control information may include, for example, information on a steering angle of the wheel.

According to an embodiment of the present disclosure, the main controller 211 may be a module associated with the SFA system and/or the RWA system, and may be a module for generating, processing, and/or managing any electrical signal for steering control of the vehicle 100.

The reaction force generation actuator 212 may be the steering feedback actuator described above. The reaction force generation actuator 212 is an actuator that provides a reaction force of the steering wheel 130 to the driver.

The reaction force generation actuator 212 is connected to one end of the steering wheel 130. The reaction force generation actuator 212 may include a torque sensor that detects a torque applied to the steering wheel 130. The reaction force generation actuator 212 may include a reaction force motor for providing a reaction force torque to the steering wheel 130.

According to an embodiment of the present disclosure, when a determination is made that an abnormality has occurred in the SBW system, the main controller 211 calculates the maximum limit steering value of the vehicle 100. To calculate the maximum steering wheel angle (Maximum Steering Wheel Angle), the main controller 211 first calculates a lateral acceleration of the vehicle 100. Here, the lateral acceleration of the vehicle 100 refers to a maximum lateral acceleration value that may be required for the vehicle 100.

The lateral acceleration of the vehicle 100 according to an embodiment of the present disclosure may be calculated using a rotation compensation value of the vehicle 100 and the steering angle by the rear wheel steering system. Here, the rotation compensation value of the vehicle 100 refers to a rotation compensation value from a one-way braking force of the vehicle 100 and a driving force of the vehicle 100. Specifically, the rear wheel steering system is a system for backing up the steering of the vehicle 100 when an abnormality occurs in the SBW system. The rear wheel steering system may rotate the left rear wheel (RL) 120 and the right rear wheel (RR) 121 of the vehicle 100 to turn the vehicle 100 to correspond to a required angle input to the steering wheel 130 by the driver.

When the required angle input to the steering wheel 130 is greater than a current turn angle of the vehicle 100, the rear-wheel steering system may apply the one-way braking force and/or driving force to all or some of the left front wheel (FL) 110, the right front wheel (FR) 111, the left rear wheel (RL) 120), and the right rear wheel (RR) 121 on the basis of a turn direction of the vehicle 100, a speed of the vehicle 100, a road surface condition, or the like. For example, in a case in which an abnormality occurs in the SBW system, when the driver turns the steering wheel 130 to the right, the rear wheel steering system rotates the left rear wheel (RL) 120 and the right rear wheel (RR) 121 to the left by a predetermined angle to assist in the steering of the vehicle so that the vehicle 100 turns to the right. Here, when a turn angle of the vehicle 100 is less than the required angle required for the steering wheel 130, the rear wheel steering system may apply a braking force to the right front wheel (FR) 111) so that an amount of turn required for the steering wheel 130 is satisfied. However, this is only one example and the present disclosure is not limited thereto. According to another embodiment of the present disclosure, a braking force and/or driving force may be applied to some or all of a plurality of wheels FR, FL, RR and RL on the basis of a turn direction required for the vehicle 100, a speed of the vehicle 100, a scrub radius of the vehicle 100, or the like.

$$R = \frac{v_x^2}{\partial y} \qquad \text{[Equation 1]}$$

Equation 1 is an equation for calculating a rotation radius (R) of the vehicle 100.

Referring to Equation 1, the rotation radius R of the vehicle 100 may be calculated as a speed of the vehicle 100 and a lateral acceleration of the vehicle 100.

$$\text{wheel base length} = R \times \theta \qquad \text{[Equation 2]}$$

Equation 2 is an equation for calculating a wheelbase value (W/B) of the vehicle 100.

Referring to Equation 2, the maximum limit steering value of the vehicle 100 may be calculated using the rotation radius R of the vehicle 100 calculated on the basis of Equation 1. A wheelbase value W/B of the vehicle 100 may be a value calculated by multiplying the rotation radius R of the vehicle 100 by the maximum limit steering value of the vehicle 100.

The main controller 211 according to an embodiment of the present disclosure may correct the maximum limit steering value (maximum steering wheel angle) by calculating a calibration factor based on a road surface condition of the vehicle 100.

Figure 3:
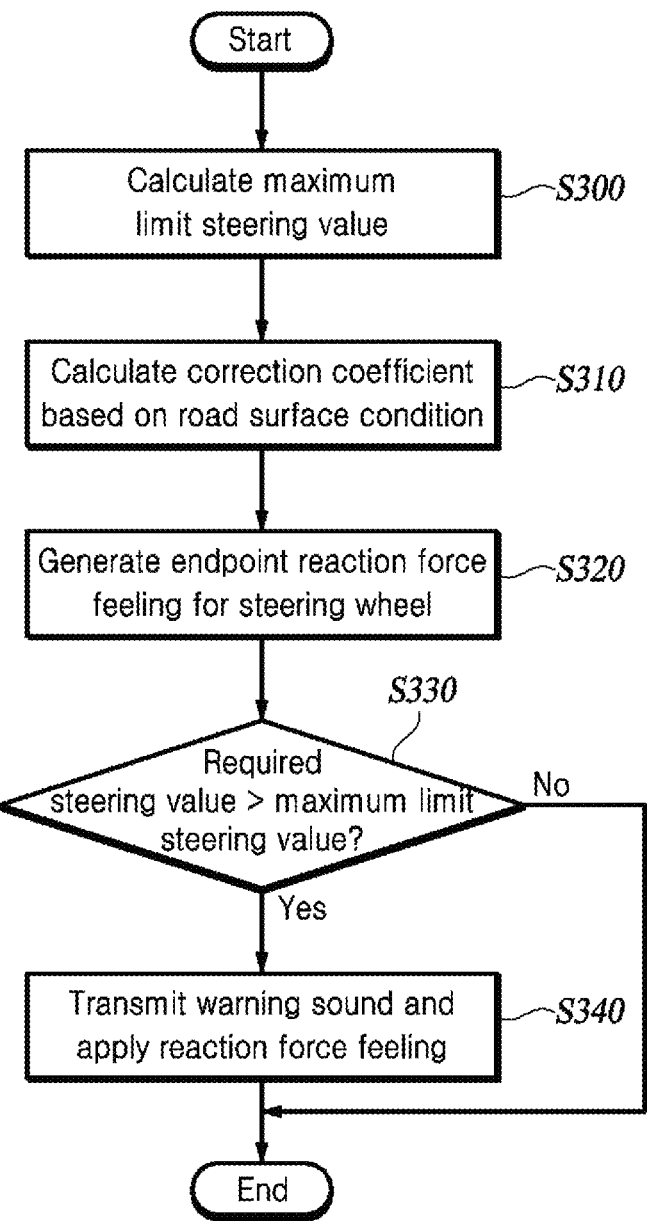
FIG. 3 is a flowchart illustrating a control method for a vehicle according to an embodiment of the present disclosure.

FIG. 3 is a flowchart illustrating a control method for the vehicle 100 according to an embodiment of the present disclosure.

Referring to FIGS. 1 to 3, the main controller 211 calculates the maximum limit steering value of the vehicle 100 (S300).

The main controller 211 calculates a correction coefficient based on the road surface condition, for the maximum limit steering value (S310).

The reaction force generation actuator 212 generates an endpoint reaction force impression, feedback or feeling for the steering wheel 130 (S320). The main controller 211 may generate the endpoint reaction force impression, feedback or feeling on the steering wheel 130 using the reaction force generation actuator 212 on the basis of the maximum limit steering value for which the correction coefficient based on the road surface condition is calculated.

The main controller 211 determines whether a required steering value required for the steering wheel 130 is greater than the maximum limit steering value of the vehicle 100 (S330). The main controller 211 receives information on the required steering value required for the steering wheel 130 from the torque sensor included in the reaction force generation actuator 212. The main controller 211 may determine whether the required steering value required for the steering wheel 130 is greater than the maximum limit steering value.

In step S330, when a determination is made that the required steering value is greater than the maximum limit steering value, a warning sound is transmitted to the driver, and a reaction force impression, feedback or feeling is applied to the steering wheel 130 (S340).

Although not illustrated in FIG. 3, when the required steering value is equal to or smaller than the maximum limit steering value in step S330, the main controller 211 performs step S320.

Figure 4:
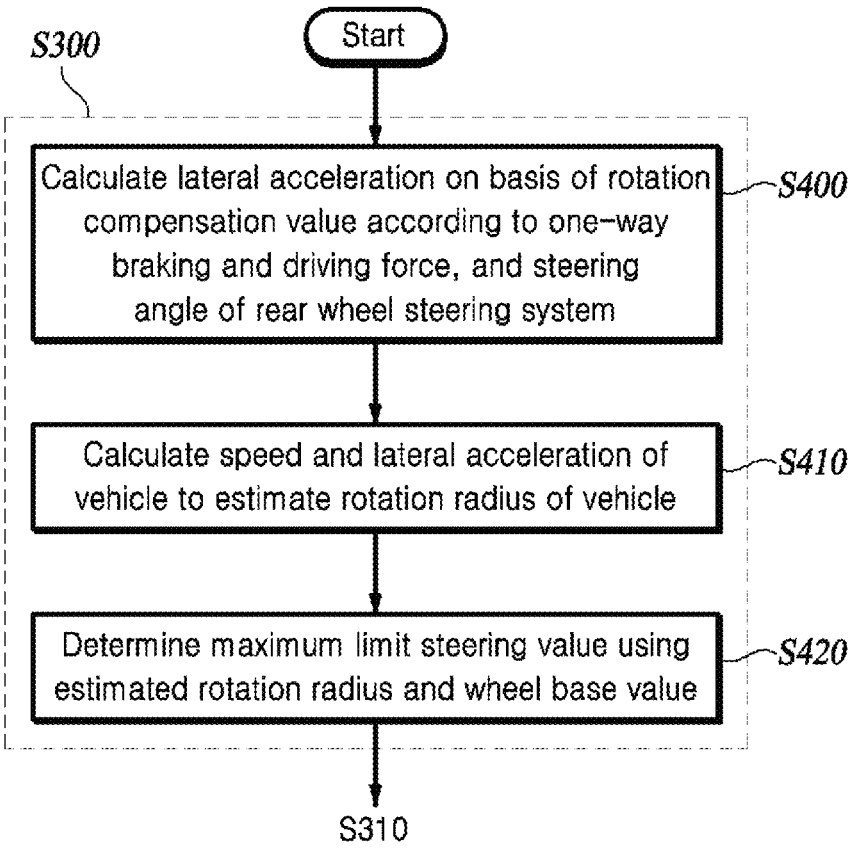
FIG. 4 is a flowchart specifically illustrating step S300 of FIG. 3.

FIG. 4 is a flowchart specifically illustrating step S300 of FIG. 3.

Referring to FIG. 4, the main controller 211 calculates the lateral acceleration of the vehicle 100 on the basis of the rotation compensation value according to the one-way braking force, and driving force and a steering angle of the rear wheel steering system (S400).

The main controller 211 calculates the speed of the vehicle 100 and the lateral acceleration of the vehicle 100 to estimate the rotation radius of the vehicle 100 (S410).

The main controller 211 determines the maximum limit steering value of the vehicle 100 based on (or using) the rotation radius of the vehicle 100 and the wheelbase value of the vehicle 100 (S420).

Figure 5:
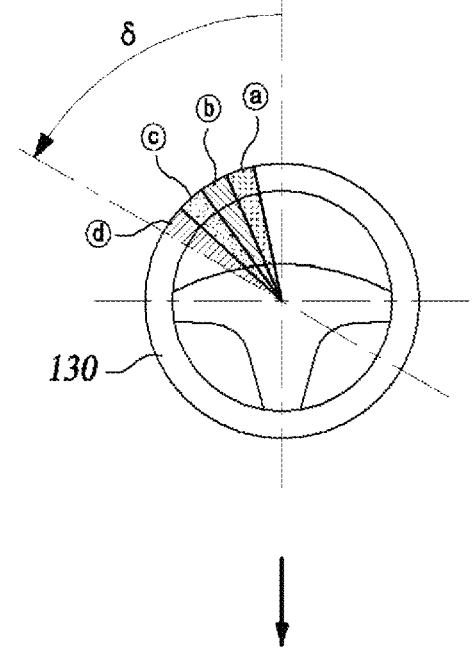
FIG. 5 is a diagram illustrating a reaction force according to a steering angle of a steering wheel on the basis of a virtual endpoint logic according to an embodiment of the present disclosure.
Figure 5:
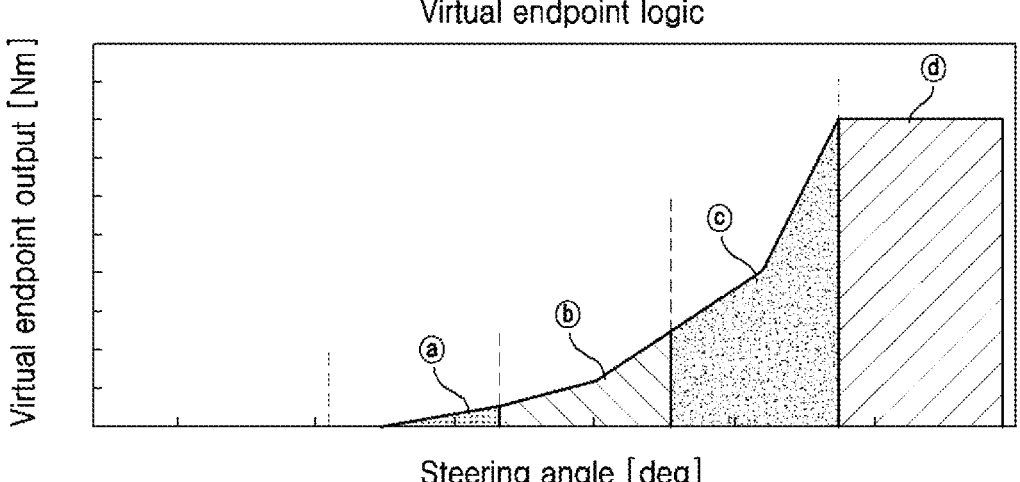

FIG. 5 is a diagram illustrating a reaction force according to a steering angle of the steering wheel on the basis of a virtual endpoint logic according to an embodiment of the present disclosure.

Referring to FIGS. 1, 2, and 5, the main controller 211 uses the reaction force generation actuator 212 to generate the endpoint reaction force impression, feedback or feeling for the steering wheel so that the driver may recognize the backup steering endpoint of the steering wheel 130.

The main controller 211 may generate the endpoint reaction force impression, feedback or feeling for the steering wheel 130 on the basis of the maximum limit steering value of the vehicle 100 based on the road surface condition. Here, the main controller 211 may generate the endpoint reaction force impression, feedback or feeling for the steering wheel 130 on the basis of the virtual endpoint logic.

The virtual endpoint logic represents a virtual endpoint output value corresponding to the steering angle of the steering wheel.

The virtual endpoint logic is formed on the basis of the maximum limit steering value of the vehicle 100, the angle of the steering wheel 130, and an angular velocity of the steering wheel 130. For example, the main controller 211 may determine, for example, which is the maximum limit steering value with reference to a basic alignment state of the steering wheel 130. Here, the basic alignment state of the steering wheel 130 means that the left front wheel (FL) 110 and the right front wheel (FR) 111 are aligned in a straight direction.

When a required steering angle of ⓐ in a left direction with reference to the basic alignment state of the steering wheel 130 is input to the steering wheel 130, a virtual endpoint output value corresponding to a slope of ⓐ in the virtual endpoint logic is applied to the steering wheel 130. When a required steering angle of ⓑ with reference to ⓐ on the steering wheel 130 is input to the steering wheel 130, the virtual endpoint output value corresponding to a slope of ⓑ on the virtual endpoint logic is applied to the steering wheel 130. When a required steering angle of ⓒ with reference to ⓑ on the steering wheel 130 is input to the steering wheel 130, the virtual endpoint output value corresponding to a slope of ⓒ on the virtual endpoint logic is applied to the steering wheel 130. When a required steering angle of ⓓ with reference to ⓒ on the steering wheel 130 is input to the steering wheel 130, the virtual endpoint output value corresponding to a slope of ⓓ on the virtual endpoint logic is applied to the steering wheel 130. Here, ⓓ on the virtual endpoint logic means, for example, a virtual endpoint output value corresponding to the maximum limit steering value of the vehicle 100.

The main controller 211 may cause the driver to recognize the limit steering value of the steering wheel on the basis of the virtual endpoint output value based on the virtual endpoint logic. Here, causing the driver to recognize the limit steering value of the steering wheel may mean applying a vibration or the like to the steering wheel and transferring the vibration to hands of the driver gripping the steering wheel.

Figure 6:
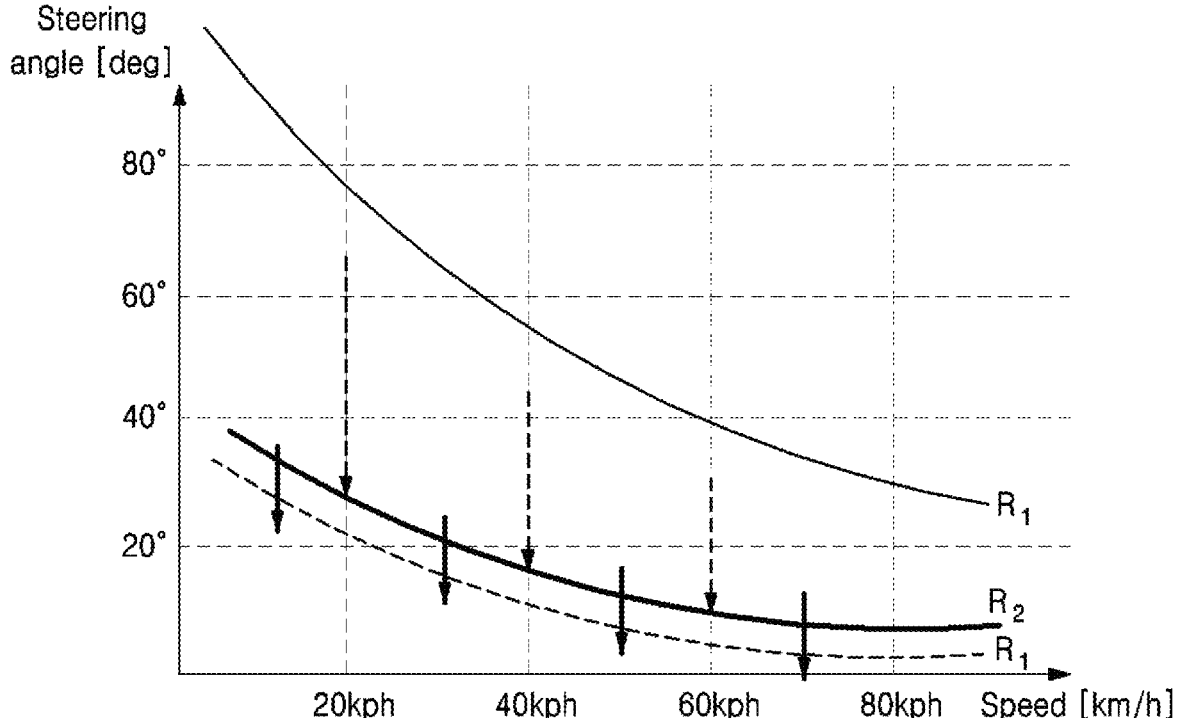
FIG. 6 is a graph showing a backup steering angle according to a speed of the vehicle according to an embodiment of the present disclosure.

FIG. 6 is a graph showing a backup steering angle according to vehicle speed according to an embodiment of the present disclosure.

Referring to FIG. 6, the main controller 211 according to an embodiment of the present disclosure may perform correction for calculating the correction coefficient based on the road surface condition of the vehicle, for the maximum limit steering value. For example, R1 is a curve showing the steering angle of the vehicle 100 based on the speed of the vehicle 100 on the basis of the SBW system. R2 is a curve showing the backup steering angle based on the speed of the vehicle 100 when the backup steering according to an embodiment of the present disclosure is performed in a case in which an abnormality occurs in the SBW system. R3 is a curve showing a steering angle based on the speed of the vehicle 100 and the road surface condition in a case in which a friction coefficient of the road surface is small when the backup steering according to an embodiment of the present disclosure is performed.

When an abnormality occurs in the SBW system, the main controller 211 performs the backup steering. Here, the main controller 211 may correct a maximum limit steering angle by R2 from R1. Further, the main controller 211 may measure the road surface condition of the vehicle with reference to the corrected maximum limit steering angle, and calculate the correction coefficient based on the measured road surface condition, for the maximum limit steering angle.

Although not illustrated in FIG. 6, when the backup steering is performed, correction may be performed to increase the steering angle on the basis of the speed of the vehicle 100 in a case in which the friction coefficient is large.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general-purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random-access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure.

In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for controlling a vehicle including a steering-by-wire (SBW) system, the method comprising:
   calculating a maximum limit steering value of a steering wheel of the vehicle in response to an occurrence of an abnormality at the SBW system;
   calculating a correction coefficient for the maximum limit steering value based on a speed of the vehicle and a road surface condition;
   generating an endpoint reaction force impression for the steering wheel;
   determining whether a required steering value input to the steering wheel exceeds the maximum limit steering value; and
   outputting a warning sound and applying the endpoint reaction force to the steering wheel in response to determining that the required steering value exceeds the maximum limit steering value.

2. The method of claim 1, wherein calculating the maximum limit steering value of the steering wheel includes calculating a lateral acceleration of the vehicle based on a rotation compensation value due to one-way braking of the vehicle, a rotation compensation value due to a driving force of the vehicle, and a steering angle by a rear wheel steering system of the vehicle.

3. The method of claim 2, wherein calculating the maximum limit steering value of the steering wheel includes:
   estimating a rotation radius of the vehicle by calculating the speed of the vehicle and the lateral acceleration of the vehicle; and
   determining a maximum limit steering value based on the estimated rotation radius and a wheelbase value of the vehicle.

4. The method of claim 1, wherein the correction coefficient is set to correct the maximum limit steering value based on a road surface friction coefficient.

5. The method of claim 1, wherein outputting the warning sound and applying the endpoint reaction force to the steering wheel include applying an endpoint steering impression to the steering wheel by setting a resistance value based on a steering angle of the steering wheel.

6. An apparatus for controlling a vehicle including a steering-by-wire (SBW) system, the apparatus comprising:
   a sensor unit configured to detect driving information of the vehicle;
   a main controller configured to implement backup steering using rear wheels of the vehicle in response to an occurrence of an abnormality in the SBW system, the backup steering including the main controller configured to determine a maximum limit steering value of the vehicle;
   a steering wheel configured to receive a required steering value based on a driver's steering intention; and
   a reaction force generation actuator configured to generate a backup steering reaction force impression for the steering wheel based on the maximum limit steering value.

7. The apparatus of claim 6, wherein the sensor unit is configured to detect at least one of a speed of the vehicle, a driving direction of the vehicle, an angular velocity of the vehicle, and a road surface condition.

8. An apparatus for controlling a vehicle including a steering-by-wire (SBW) system, the apparatus comprising:
   a sensor unit configured to detect driving information of the vehicle;
   a main controller configured to generate a backup steering reaction force impression for the SBW system and determine a maximum limit steering value of the vehicle;
   a steering wheel configured to receive a required steering value based on a driver's steering intention; and
   a reaction force generation actuator configured to generate a reaction force impression for the steering wheel based on the maximum limit steering value;
   wherein the main controller is configured to calculate:
   a lateral acceleration of the vehicle based on a rotation compensation value due to one-way braking of the vehicle;
   a rotation compensation value due to a driving force of the vehicle; and
   a steering angle by a rear wheel steering system of the vehicle.

9. The apparatus of claim 8, wherein the main controller is further configured to:
   estimate a rotation radius of the vehicle by calculating a speed of the vehicle and the lateral acceleration of the vehicle;
   determine a maximum limit steering value based on the estimated rotation radius and a wheelbase value of the vehicle; and
   calculate, based on a road surface condition, a correction coefficient for the maximum limit steering value.

10. The apparatus of claim 6, wherein the main controller is configured to:
   determine whether the required steering value received by the steering wheel exceeds the maximum limit steering value; and
   output a warning sound and apply a vibration to the steering wheel in response to determining that the required steering value exceeds the maximum limit steering value.

\* \* \* \* \*